(12) United States Patent
Kim et al.

(10) Patent No.: US 12,379,486 B2
(45) Date of Patent: Aug. 5, 2025

(54) METHOD OF CALCULATING POWER LEVEL REFLECTANCE OF OBJECT ON GROUND USING SAR IMAGE

(71) Applicant: KOREA AEROSPACE RESEARCH INSTITUTE, Daejeon (KR)

(72) Inventors: Dong Hyun Kim, Daejeon (KR); Do Chul Yang, Daejeon (KR); Ho Ryung Jeong, Sejong-si (KR); Doo Chun Seo, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 345 days.

(21) Appl. No.: 18/064,389

(22) Filed: Dec. 12, 2022

(65) Prior Publication Data

US 2023/0184929 A1 Jun. 15, 2023

(51) Int. Cl.
 *G01S 13/90* (2006.01)

(52) U.S. Cl.
 CPC ............................... *G01S 13/9054* (2019.05)

(58) Field of Classification Search
 CPC .... G01S 13/9054; G01S 7/4021; G01S 13/90; G01S 13/9021; G01S 7/4008; G06T 2207/10044
 See application file for complete search history.

(56) References Cited

FOREIGN PATENT DOCUMENTS

| EP | 3364212 A1 | * | 8/2018 | ............ G01S 13/90 |
|---|---|---|---|---|
| KR | 20110097277 A | * | 8/2011 | |
| KR | 1020200084463 | | 7/2020 | |
| KR | 102188035 | | 12/2020 | |

OTHER PUBLICATIONS

Dong Hyun Kim et al., "Method for Analysis of Digital Number of SAR Image Data", Main Research Institute: Korea Aerospace Research Institute, Publisher: KSAS 2021 Fall Conference (Nov. 17, 2021).

* cited by examiner

*Primary Examiner* — Vladimir Magloire
*Assistant Examiner* — Bongani Jabulani Mashele
(74) *Attorney, Agent, or Firm* — Perman & Green, LLP

(57) ABSTRACT

A method of calculating power level reflectance $\sigma_0$ of an object on the ground using synthetic aperture radar (SAR) image includes receiving the SAR image composed of pixels each having a complex value ($I_{DN}+jQ_{DN}$), local incidence angle data including local incidence angle values respectively corresponding to the pixels of the SAR image and a reflection coefficient $K_2$ of the SAR image, calculating power level reflectance $\beta_0$ on a slant range domain of a first object corresponding to a first pixel based on the complex value ($I_{DN}+jQ_{DN}$) of the first pixel in the SAR image and the reflection coefficient $K_2$, and calculating, using an equation that $\sigma_0=\beta_0\cdot(\sin\theta_i)^2$, power level reflectance $\sigma_0$ of the first object on the ground based on the power level reflectance $\beta_0$ of the first object on the slant range domain and the local incidence angle value $\theta_i$ corresponding to the first pixel.

15 Claims, 7 Drawing Sheets

METHOD OF CALCULATING POWER LEVEL REFLECTANCE OF OBJECT ON GROUND USING SAR IMAGE

CROSS-REFERENCE TO RELATED APPLICATION

This application is based on and claims priority under 35 U.S.C. § 119 to Korean Patent Application No. 10-2021-0179974, filed on Dec. 15, 2021, in the Korean Intellectual Property Office, the disclosure of which is incorporated by reference herein in its entirety.

BACKGROUND

1. Field

The disclosure relates to a method of analyzing brightness value information of a synthetic aperture radar (SAR) image, and more particularly, to a method of calculating power level reflectance ($\sigma_0$, sigma naught) of an object on the ground using a digital number of complex data of an SAR image. The disclosure also relates to a method of generating an SAR image and a reflection coefficient thereof from SAR raw data received from an SAR device.

2. Description of the Related Art

In recent years, the domestic demand for technology utilizing SAR image data generated using satellite SAR systems has increased. This is due to the high operability in all weathers and excellent accuracy of location information in view of radar principle of SAR system, as well as the desire to create more useful information and value in many different fields using application technology based on objective data that quantitatively measures and interprets the response characteristics of an object to microwaves.

To achieve this, it is necessary to accurately analyze brightness value information of SAR image. The interpretation of digital number of SAR complex image data that is well known in the art is based on radar equations. In other words, the signal intensity of radar beam emitted from a sensor, which hits an object at a certain distance and returns, is represented by mathematical modeling.

$$P_r = \frac{P_t G_{Ant}^2 \lambda^2}{(4\pi)^3 R^4} \cdot RCS$$

where $P_r$ is reception power, $P_t$ is transmission power, $G^2_{Ant}$ is antenna transmission/reception gain, $\lambda$ is wavelength, R is distance, and RCS is radar cross section. The conceptual area of an object from which radar beams are reflected is expressed as RCS (m$^2$) to be proportional to brightness information of acquired signals. That is, the concept that the brightness value of radar data is the product of the power flux density of radiating radar beams multiplied by the radar cross section of an object from which the radar beams are reflected is used.

The concept is also applied to single look complex (SLC) image data of SAR to estimate and define the brightness value of general SAR image data by parameterizing the conceptual cross section of object, which is simple, universal and logically reasonable. In addition, the reflectance of an object is obtained by dividing the conceptual area parameter by the actual resolution area.

However, this method does neither specify which physical aspects of an observed actual object are reflected nor analyze how the specified characteristic factors affect the brightness value of SAR image data nor specifically analyze the reflectance of point target and distributed target.

SUMMARY

Provided is a method of specifically analyzing brightness value information of SLC image data by defining power level reflectance ($\sigma_0$, sigma naught) of an object on the ground, and analyzing, from the hardware point of view, the process of acquiring SAR signals and the process of signal processing and imaging SAR raw data based on the defined power level reflectance. That is, provided is a different method than the existing methods of analyzing the relation between the brightness value of SAR complex image data and the reflectance of object.

Also, provided is a method of calculating power level reflectance ($\sigma_0$, sigma naught) of an object on the ground using an SAR image.

Also, provided is a method of generating an SAR image and a reflection coefficient $K_2$ thereof.

Additional aspects will be set forth in part in the description which follows and, in part, will be apparent from the description, or may be learned by practice of the presented embodiments of the disclosure.

According to an aspect of the disclosure, as technical means for achieving the aims above, a method of calculating power level reflectance $\sigma_0$ of an object on the ground using synthetic aperture radar (SAR) image, performed by a computing device, includes receiving the SAR image composed of pixels arranged in two dimensions and each having a complex value ($I_{DN}+jQ_{DN}$), local incidence angle data including local incidence angle values respectively corresponding to the pixels of the SAR image and a reflection coefficient $K_2$ of the SAR image, calculating power level reflectance $\beta_0$ on a slant range domain of a first object corresponding to a first pixel based on complex value ($I_{DN}+jQ_{DN}$) of the first pixel in the SAR image and the reflection coefficient $K_2$, and calculating, using $\sigma_0=\beta_0 \cdot (\sin \theta_i)^2$, the power level reflectance $\sigma_0$ of the first object on the ground based on the power level reflectance $\beta_0$ of the first object on the slant range domain and the local incidence angle value $\theta_i$ corresponding to the first pixel.

According to an embodiment, the power level reflectance $\beta_0$ of the first object on the slant range domain may be calculated using $\beta_0 = K_2 \cdot (I_{DN}^2 + Q_{DN}^2)$.

According to another embodiment, the method may further include calculating, using $\gamma_0 = \beta_0 \cdot (\tan \theta_i)^2$, power level reflectance $\gamma_0$ of the first object on a vertical domain in a beam radiation direction based on power level reflectance $\beta_0$ of the first object on the slant range domain and local incidence angle value $\theta_i$ corresponding to the first pixel.

According to an aspect of the disclosure, a method of generating synthetic aperture radar (SAR) image performed by a computing device and a reflection coefficient $K_2$ thereof includes determining a rescaling factor (RF) of the SAR image generated by capturing an area to be photographed with SAR device, determining a calibration constant (Calco) of SAR processing system that has generated the SAR image, determining an operation mode factor $\beta_3$ for a point target of the SAR image, determining an operation mode factor $\beta_4$ for a distributed target of the SAR image, determining an SAR image processing coefficient $K_0$ of the SAR image, and calculating, using $K_2=RF^2 \cdot \beta_3^2 \cdot Calco/(\beta_4^2 \cdot K_0^2)$, a reflection coefficient $K_2$ of the SAR image based on the rescaling factor (RF), the operation mode factor $\beta_3$ for the point target, the operation mode factor $\beta_4$ for the distributed target, the calibration constant (Calco), and the SAR image processing coefficient $K_0$.

According to an embodiment, determining a rescaling factor (RF) of the SAR image may include determining a reference slant range $R_{slant\_ref}$ from the SAR device to an area to be photographed, determining a quantization coefficient (Qs) used to determine digital number (DN) of each pixel of the SAR image, and calculating the rescaling factor (RF) using $RF=4\pi R_{slant\_ref}^2 \cdot Qs$.

According to another embodiment, determining a calibration coefficient (Calco) of SAR processing system includes generating SAR raw data by observing a point target of which radar cross section $RCS_{point\_target}$, location and position are known using the SAR device operating in strip map mode, generating a first raw SAR image by compensating for an antenna pattern in accordance with positional relation between the point target and the SAR device using RCS profile data according to the antenna pattern for the point target without applying windowing to the SAR raw data, generating a first SAR image by removing a clutter level from the first raw SAR image, and calculating, using $DN_1 \cdot RF \cdot (Calco)^{1/2}=(RCS_{point\_target})^{1/2}$, the calibration constant (Calco) based on the radar cross section of the point target $RCS_{point\_target}$, digital number $DN_1$ of pixels corresponding to the location of the point target of the first SAR image and the rescaling factor (RF).

According to another embodiment, generating a first SAR image by removing a clutter level from the first raw SAR image may include calculating clutter complex values corresponding to the clutter level based on complex values of an area independent of the point target in the first raw SAR image, generating a first SAR complex image by subtracting the clutter complex values from complex values of all pixels of the first raw SAR image, and generating the first SAR image by calculating the magnitude of each complex value of all pixels of the first SAR complex image.

According to another embodiment, determining an operation mode factor $\beta_3$ for a point target of the SAR image may include generating a second SAR image by observing the point target using the SAR device operating in the same operation mode as the SAR image and performing SAR image processing, and calculating, using $DN_1=DN_2 \cdot \beta_3$, the operation mode factor $\beta_3$ for the point target based on digital number $DN_1$ of pixels corresponding to the location of the point target of the first SAR image and the digital number $DN_2$ of pixels corresponding to the location of the point target of the second SAR image.

According to another embodiment, determining an operation mode factor $\beta_3$ for a point target of the SAR image may include determining a first rescaling factor $RF_1$ of the first SAR image, generating a second SAR image by observing the point target using the SAR device operating in the same operation mode as the SAR image and performing SAR image processing, determining a second rescaling factor $RF_2$ of the second SAR image, and calculating, using $DN_1 \cdot RF_1 = DN_2 \cdot RF_2 \cdot \beta_3$, the operation mode factor $\beta_3$ for the point target based on digital number $DN_1$ of pixels corresponding to the location of the point target of the first SAR image, the first rescaling factor $RF_1$, digital number $DN_2$ of pixels corresponding to the location of the point target of the second SAR image and the second rescaling factor $RF_2$.

According to another embodiment, determining an operation mode factor $\beta_4$ for a distributed target of the SAR image may include generating a third SAR image by observing a homogeneous area of which location is known using the SAR device operating in the strip map mode and performing SAR image processing, generating a fourth SAR image by observing the homogeneous area at the same observation location using the SAR device operating in the same operation mode as the SAR image and performing SAR image processing, determining a resolution ratio $\rho_{slrrfocd4}$ in a slant range direction of the fourth SAR image to the third SAR image, determining a resolution ratio $\rho_{slrafocd4}$ in an azimuth direction of the fourth SAR image to the third SAR image, and calculating, using $DN_3=DN_4 \cdot \beta_3/(\rho_{slrrfocd4} \cdot \rho_{slrafocd4} \cdot 4)$, the operation mode factor $\beta_4$ for the distributed target of the SAR image based on digital number $DN_3$ of pixels corresponding to the location of the homogeneous area of the third SAR image, digital number $DN_4$ of pixels corresponding to the location of the homogeneous area of the fourth SAR image and the operation mode factor $\beta_3$ for the point target.

According to another embodiment, determining an SAR image processing coefficient $K_0$ of the SAR image may include determining a resolution ratio $\rho_{slrrfocd}$ in a slant range direction of the SAR image to the first SAR image, determining a resolution ratio $\rho_{slrafocd}$ in an azimuth direction of the SAR image to the first SAR image, determining a peak reduction rate $\alpha\beta_1$ depending on whether windowing is applied during SAR image processing, determining an amplification factor $f_{broadf\_ra\_az}$ according to windowing application during SAR image processing, and calculating, using $K_0=\alpha\beta_1 \cdot \rho_{slrrfocd} \cdot \rho_{slrafocd} \cdot f_{broadf\_ra\_az}$, the SAR image processing coefficient $K_0$ based on the peak reduction rate $\alpha\beta_1$, the resolution ratio in the slant range direction $\rho_{slrrfocd}$, the resolution ratio in the azimuth direction $\rho_{slrafocd}$, and the amplification factor $f_{broadf\_ra\_az}$.

According to another embodiment, the resolution ratio $\rho_{slrrfocd}$ in the slant range direction may be calculated by the ratio of the resolution in the slant range direction of the SAR image to the resolution in the slant range direction of the first SAR image.

According to another embodiment, the resolution ratio $\rho_{slrafocd}$ in the azimuth direction may be calculated by a ratio of the resolution in the azimuth direction of the SAR image to the resolution in the azimuth direction of the first SAR image.

According to another embodiment, determining a peak reduction rate $\alpha\beta_1$ depending on whether windowing is applied during the SAR image processing may include generating a second raw SAR image by applying windowing to the SAR raw data and compensating for the antenna pattern in accordance with positional relation between the point target and the SAR device using RCS profile data according to the antenna pattern for the point target, generating a fifth SAR image by removing a clutter level from the second raw SAR image, and calculating, using $DN_{f5}=DN_{f1} \cdot \alpha\beta_1$, the peak reduction rate $\alpha\beta_1$ based on peak digital number $DN_{f1}$ of pixels corresponding to the location of the point target of the first SAR image and peak digital number $DN_{f5}$ of pixels corresponding to the location of the point target of the fifth SAR image.

According to another embodiment, generating a first SAR image by removing a clutter level from the first raw SAR image may include calculating a first clutter complex value corresponding to the clutter level based on complex values of an area independent of the point target in the first raw SAR image, and generating a first SAR complex image by subtracting the first clutter complex value from complex values of all pixels of the first raw SAR image.

When windowing is not applied during SAR image processing for generating the SAR image, the amplification factor $f_{broadf\_ra\_az}$ according to windowing application during the SAR image processing may be determined by the magnitude value of complex values which is the sum of complex values of all pixels of the first SAR complex image divided by peak digital number $DN_{f1}$ of pixels corresponding to the location of the point target of the first SAR image.

According to another embodiment, generating a fifth SAR image by removing a clutter level from the second raw SAR image may include calculating a second clutter complex value corresponding to the clutter level based on complex values of an area independent of the point target in the second raw SAR image, and generating a second SAR complex image by subtracting the second clutter complex value from complex values of all pixels of the second raw SAR image.

When windowing is applied during SAR image processing for generating the SAR image, the amplification factor $f_{broadf\_ra\_az}$ according to windowing application during the SAR image processing may be determined by the magnitude value of complex values which is the sum of complex values of all pixels of the second SAR complex image divided by peak digital number $DN_{f5}$ of pixels corresponding to the location of the point target of the fifth SAR image.

According to another embodiment, determining an operation mode factor $\beta_4$ for a distributed target of the SAR image may include generating a third SAR image by observing a homogeneous area of which location is known using the SAR device operating in the strip map mode and performing SAR image processing; determining a third rescaling factor $RF_3$ of the third SAR image, determining a local incidence angle $\theta_3$ corresponding to the homogeneous area in the third SAR image based on the location of the homogeneous area and the observation location of the SAR device; generating a fourth SAR image by observing the homogeneous area using the SAR device operating in the same operation mode as the SAR image and performing SAR image processing, determining a fourth rescaling factor $RF_4$ of the fourth SAR image; determining a resolution ratio $\rho_{slrrfocd4}$ in a slant range direction of the fourth SAR image to the third SAR image, determining a resolution ratio $\rho_{slrafocd4}$ in an azimuth direction of the fourth SAR image to the third SAR image, determining a local incidence angle $\theta_4$ corresponding to the homogeneous area in the fourth SAR image based on the location of the homogeneous area and the observation location of the SAR device, and calculating, using $DN_3 \cdot RF_3 \cdot \sin\theta_3 = DN_4 \cdot RF_4 \cdot \sin\theta_4 \cdot \beta_3/(\rho_{slrrfocd4} \cdot \rho_{slrafocd4} \cdot \beta_4)$, the operation mode factor $\beta_4$ for the distributed target of the SAR image based on digital number $DN_3$ of pixels corresponding to the location of the homogeneous area of the third SAR image, digital number $DN_4$ of the pixels corresponding to the location of the homogeneous area of the fourth SAR image and the operation mode factor $\beta_3$ for the point target.

According to another embodiment, the power level reflectance $\sigma_{0\_3}$ of the homogeneous area on the ground calculated based on the third SAR image may be identical to the power level reflectance $\sigma_{0\_4}$ of the homogeneous area on the ground calculated based on the fourth SAR image.

As technical means to achieve the aims mentioned above, a computer program according to another aspect of the disclosure is stored in a medium to perform the method mentioned above.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
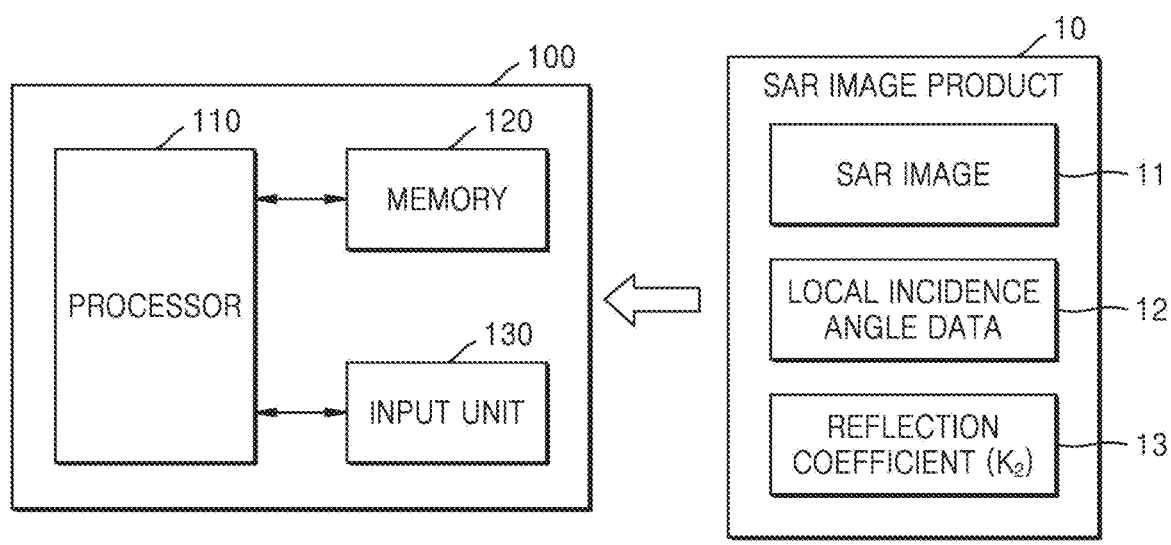
FIG. 1 shows a computing device for calculating power level reflectance $\sigma_0$ of an object on the ground using a synthetic aperture radar (SAR) image, according to the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments will be described in detail with reference to the accompanying drawings so that a person skilled in the art to which the disclosure pertains may easily implement them. However, the technical ideas of the disclosure are not limited to the embodiments described herein since they may be modified and implemented in various forms. In describing the embodiments disclosed herein, when it is determined that a detailed description of related art may obscure the subject matter of the disclosure, detailed description of the related art will be omitted. The same or similar components will be given the same reference numbers, and overlapping descriptions thereof will be omitted.

When an element is referred to as being "connected" with another element in the present description, this includes not only when they are "directly connected" but also "indirectly connected" with another element interposed in between. When an element is referred to as "including" any other elements, this means that the element may include other elements further, without excluding other elements, unless specifically stated otherwise.

Some embodiments may be described in terms of functional block configurations and various processing steps. Some or all of these functional blocks may be implemented in various numbers of hardware and/or software configurations that perform specific functions. For example, functional blocks of the disclosure may be implemented by one or more microprocessors or by circuit configurations for a certain function. Functional blocks of the disclosure may be implemented in various programming or scripting languages. Functional blocks of the disclosure may be implemented as an algorithm running on one or more processors.

A function performed by a functional block of the disclosure may be performed by a plurality of functional groups, or functions performed by a plurality of functional blocks of the disclosure may be performed by one functional block. In addition, the disclosure may employ related art for electronic configuration, signal processing, and/or data processing.

Synthetic aperture radar (SAR) raw data acquired through the operation of an SAR device and hardware includes complex values acquired by generating voltage signals using satellite's power device and oscillator, converting the generated voltage signals into electromagnetic waves for transmission, receiving echo signals which are returned electromagnetic waves, and converting the received echo signals into voltage levels for storage. A radar discharge equation for power level of the obtained signals is as follows:

$$P_r = \lambda^2/(4\pi) \cdot P_t \cdot A_e^t \cdot G^t \cdot \sigma \cdot A_e^r \cdot G^r/(4\pi R_{slant}^2)^2 \cdot \textit{eff}$$

where $P_r$ is reception power, $\lambda$ is wavelength, $P_t$ is transmission power, $A_e^t$ is antenna efficiency in transmission, $G^t$ is absolute antenna gain in transmission, $\sigma$ is radar cross section from which radar beam is reflected on the ground, $A_e^r$ is antenna efficiency in reception, $G^r$ is absolute antenna gain in reception, $R_{slant}$ is slant range, and $\textit{eff}^{-1}$ is calibration constant which is gain offset of SAR system.

The signal of received voltage level is as follows:

$$V_r = (R \cdot P_r)^{1/2}$$

where R is resistance value of an electronic circuit.

By inputting raw data of this voltage level, an SAR image forming and processing process is performed to obtain digital number (DN) data of a single look complex (SLC) image. The relation between digital number and radar cross section ($\sigma$) is as follows:

$$\sigma^{1/2} = DN \cdot RF / \textit{eff}^{1/2}$$

where RF is a rescaling factor of SLC image and may be defined as follows:

$$RF = 4\pi R_{slant\_ref}^2 \cdot Quantization_{step} / (RaProcScale \cdot AzProcScale)$$

where $R_{slant\_ref}$ is a reference slant range, $Quantization_{step}$ is a quantization step value, and RaProcScale and AzProcScale are scaling factors applied to image processing in a slant range direction and in an azimuth direction, respectively. An initial correction constant (eff) is 1. $Quantization_{step}/(RaProcScale \cdot AzProcScale)$ may be expressed as a quantization coefficient (Qs) used to determine digital number (DN) of each pixel of SAR image.

In the above equations, the data size information is a result of overlap and interference of 2D sinc functions which are responses of SAR system, and the size of signals is adjusted by compression so that there is no dependence on bandwidth. There are assumptions about bright values of SAR image data as follows:

Assumption 1) The unit of an object is a small dot and has unique structural and organizational reflective properties.

Assumption 2) The brightness value of image for distributed target is a result of constructive interference of response signals to point targets constituting the object.

Assumption 3) The spatial transformation of brightness value information of distributed target is based on density of voltage level signals.

Assumption 4) The noise level or antenna distortion in image data is already compensated.

From the above equations, a relationship between a brightness value and a physical quantity on SAR image data is as follows:

$$\beta^{1/2} = DN \cdot RF \cdot \beta_3 \cdot calco^{1/2}$$

where $\beta_3$ is an operation mode factor for point target, which is 1 when operating in a strip map mode and is set through calculation in other operation modes. $\beta$ is power level reflectance of an object on the slant range, zero doppler image domain. Calco is a calibration constant of SAR processing system.

The result of analyzing theoretical brightness value information on an object on SAR image as inherent reflection characteristics of material and image processing-related parameters is as follows:

$$\beta^{1/2} = \beta_0^{1/2} \cdot \alpha_1 \cdot \rho_{slrrfocad} \cdot f_{broadf\_ra}[slrwc] \cdot \beta_1 \cdot \rho_{slrafocd} \cdot f_{broadf\_az}[azwc] \cdot \beta_4$$

where $\beta_0$ is a power level reflectance of an object on a slant range domain. $\alpha_1$ is a sinc peak reduction rate in a slant range direction due to windowing in a slant range direction, and $\beta_1$ is a sinc peak reduction rate in an azimuth direction due to windowing in an azimuth direction.

$\rho_{slrrfocad}$ is a ratio of the resolution of the present image in a slant range direction to the resolution of certain reference mode/beam in a slant range direction, and may be determined by using the slant range resolution information considering only slant range band width information. $\rho_{slrafocd}$ is a ratio of the resolution of the present image in an azimuth direction to the resolution of a certain reference mode/beam in an azimuth direction, and may be determined by using the azimuth direction resolution information considering only azimuth direction band width information.

$f_{broadf\_ra}$ is a ratio of constructive interference in a slant range direction by broadening due to windowing in a slant range direction, and slrwc is a windowing coefficient in a slant range direction. $f_{broadf\_az}$ is a ratio of constructive interference in an azimuth direction by broadening due to windowing in an azimuth direction, and azwc is a windowing coefficient in an azimuth direction. $\beta_4$ is an operation mode factor for a distributed target, which is 1 in strip mode and is set through calculation in other operation modes.

$\rho_{slrrfocad}$, $\rho_{slrafocd}$, $f_{broadf\_ra}$, $f_{broadf\_az}$, and $\beta_4$ are for a distributed target and have a value of 1 for a point target.

By applying the above equation to a point target such as a corner reflector or an active transponder, the theoretical brightness value on the SAR image may be analyzed.

$$\beta^{1/2} = RCS_{pt}^{1/2} \cdot \alpha_1 \cdot \beta_1$$

where $RCS_{pt}$ replaces $\beta_0$ in consideration of structural and functional characteristics of artificial point target.

Parameters of the above equations may be calculated using SLC Data generated by observing and image processing a corner reflector or an active transponder using strip map operation mode and standard beam. When windowing is not applied, it may be used that both of $\alpha_1$ and $\beta_1$ are 1.

The power level reflectance of an object may be calculated as follows:

$$\beta_0 = \sigma_0/(\sin \theta_i)^2$$

$$\gamma_0 \sigma_0/(\cos \theta_i)^2$$

where $\sigma_0$ is power level reflectance of an object on the ground, and $\gamma_0$ is power level reflectance of an object on a vertical domain in a beam radiation direction. $\theta_i$ is a local incidence angle.

In the disclosure, the relation between the bright value of image and the reflectance of an object is analyzed and derived in consideration of image processing of voltage level data.

FIG. 1 shows a computing device for calculating power level reflectance $\sigma_0$ of an object on the ground.

Referring to FIG. 1, a computing device according to the disclosure may include a processor 110, a memory 120, and an input unit 130. The processor 110, the memory 120, and the input unit 130 may exchange data with each other via a bus. The computing device 100 may include additional components, such as a communication module, an input/output module, an input/output device, and a storage device, in addition to the components illustrated in FIG. 1.

The processor 110 may be configured to process commands of a computer grogram by performing basic arithmetic, logic, and input/output operations. The commands are stored in the memory 120, and the processor 110 may read out commands stored in the memory 120. For example, the processor 110 may be configured to execute received commands according to program code stored in the memory 120.

The memory 120 is a computer-readable recording medium and may include a random-access memory (RAM), a read-only memory (ROM), and a permanent mass storage device such as disk drive. In addition, program code for controlling the computing device 100 may be temporarily or permanently stored in the memory 120.

The input unit 130 may receive an SAR image product 10 from an external device. The input unit 130 may be a communication module capable of receiving the SAR image product 10 through wired or wireless network. The input unit 130 may be an input device capable of reading a storage medium in which the SAR image product 10 is stored.

The SAR image product 10 may include SAR image 11, local incidence angle data 12 and a reflection coefficient $K_2$ 13. The SAR image is an image composed of pixels arranged in two dimensions and each having a complex value ($I_{DN}+jQ_{DN}$), and may be, for example, a single look complex (SLC) image. The SAR image 11 may have the resolution in a slant range direction and the resolution in an azimuth direction, and pixels corresponding to the product of these resolutions are arranged in two dimensions. Each pixel has a complex value ($I_{DN}+jQ_{DN}$).

The local incidence angle data 12 includes local incidence angle values $\theta_i$ respectively corresponding to pixels of the SAR image 11. The local incidence angle means an angle between a line perpendicular to a certain location or the surface of an object at the location and a radar beam incident on the location. According to an embodiment, local incidence angle data may have the same number of local incidence angle values $\theta_i$ as the number of pixels in the SAR image 11. Local incidence angle values corresponding to pixels in the SAR image 11 may be included in the local incidence angle data 12. According to another embodiment, local incidence angle data 12 may have more or less local incidence angle values $\theta_i$ than the number of pixels in the SAR image 11, and the local incidence angle values $\theta_i$ respectively corresponding to pixels in the SAR image 11 may be calculated using local incidence values of the local incidence angle data 12, for example, using interpolation.

The reflection coefficient $K_2$ 13 is a value calculated in consideration of hardware and software processes for generating the SAR image 12, and will be described in more detail below.

The SAR image product 10 including the SAR image 11, the local incidence angle data 12 and the reflection coefficient $K_2$ 13 may be received and stored in the memory 120 by the input unit 130. The processor 110 may calculate power level reflectance $\sigma_0$ of an object on the ground displayed in the SAR image 11 using the SAR image 11, the local incidence angle data 12 and the reflection coefficient $K_2$ 13.

Figure 2:
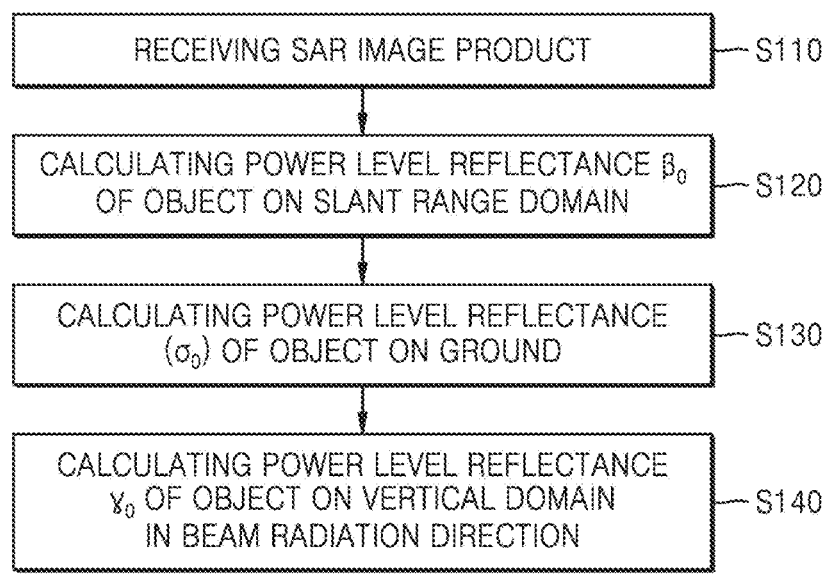
FIG. 2 is a flowchart illustrating a method of calculating power level reflectance $\sigma_0$ of an object on the ground using an SAR image, according to the disclosure.

FIG. 2 is a flowchart illustrating a method of calculating power level reflectance $\sigma_0$ of an object on the ground using SAR image according to the disclosure.

Referring to FIG. 1 and FIG. 2, the input unit 130 may receive the SAR image 11 composed of pixels arranged in two dimensions and each having a complex value ($I_{DN}+jQ_{DN}$), the local incidence angle data including local incidence angle values respectively corresponding to the pixels of the SAR image 11 and the reflection coefficient $K_2$ 13 of the SAR image 11 (S110). The SAR image 11, the local incidence angle data 12 and reflection coefficient $K_2$ 13 may be stored in the memory (12) and may be read by the processor 110.

The processor may calculate power level reflectance $\beta_0$ on a slant range domain of a first object corresponding to a first pixel based on any complex value ($I_{DN}+jQ_{DN}$) of first pixel in the SAR image 11 and the reflection coefficient $K_2$ 13 (S120). The processor may calculate the power level reflectance $\beta_0$ of an object on slant range domain using $\beta_0 = K_2 \cdot (I_{DN}^2 + Q_{DN}^2)$ or $\beta_0 = K_2 \cdot DN^2$, where $I_{DN}$ and $Q_{DN}$ are values included in the SAR image 11, and $K_2$ is a reflection coefficient $K_2$ 13, which is a value included in and received by the SAR image product 10 in S110. DN is digital number corresponding to the size of first pixel, and is the size (i.e., absolute value) of complex value ($I_{DN}+jQ_{DN}$) of first pixel.

The processor 120 may calculate power level reflectance $\sigma_0$ of first object on the ground based on the power level reflectance $\beta_0$ of first object on the slant range domain calculated in S120 and the local incidence angle value $\theta_i$ corresponding to the first pixel received in S110 (S130). According to the disclosure, the processor 110 may calculate power level reflectance $\sigma_0$ of first object on the ground by using $\sigma_0 = \beta_0 \cdot (\sin \theta_i)^2$.

The processor 120 may calculate power level reflectance $\gamma_0$ of first object on the vertical domain in the beam radiation direction based on the power level reflectance $\beta_0$ of first object on the slant range domain calculated in S120 and the local incidence angle value $\theta_i$ corresponding to the first pixel received in S110 (S140). According to the disclosure, the processor 110 may calculate power level reflectance $\gamma_0$ of first object on the vertical domain in the beam radiation direction using $\gamma_0 = \beta_0 \cdot (\tan \theta_i)^2$.

This is because spatial transformation of image data must be performed at voltage level since power flux density of transmission beam and reception beam is compensated and normalized during SAR signal processing, each target point is compressed on the slant range domain at voltage level, and signals for multiple points are superimposed.

Figure 3:
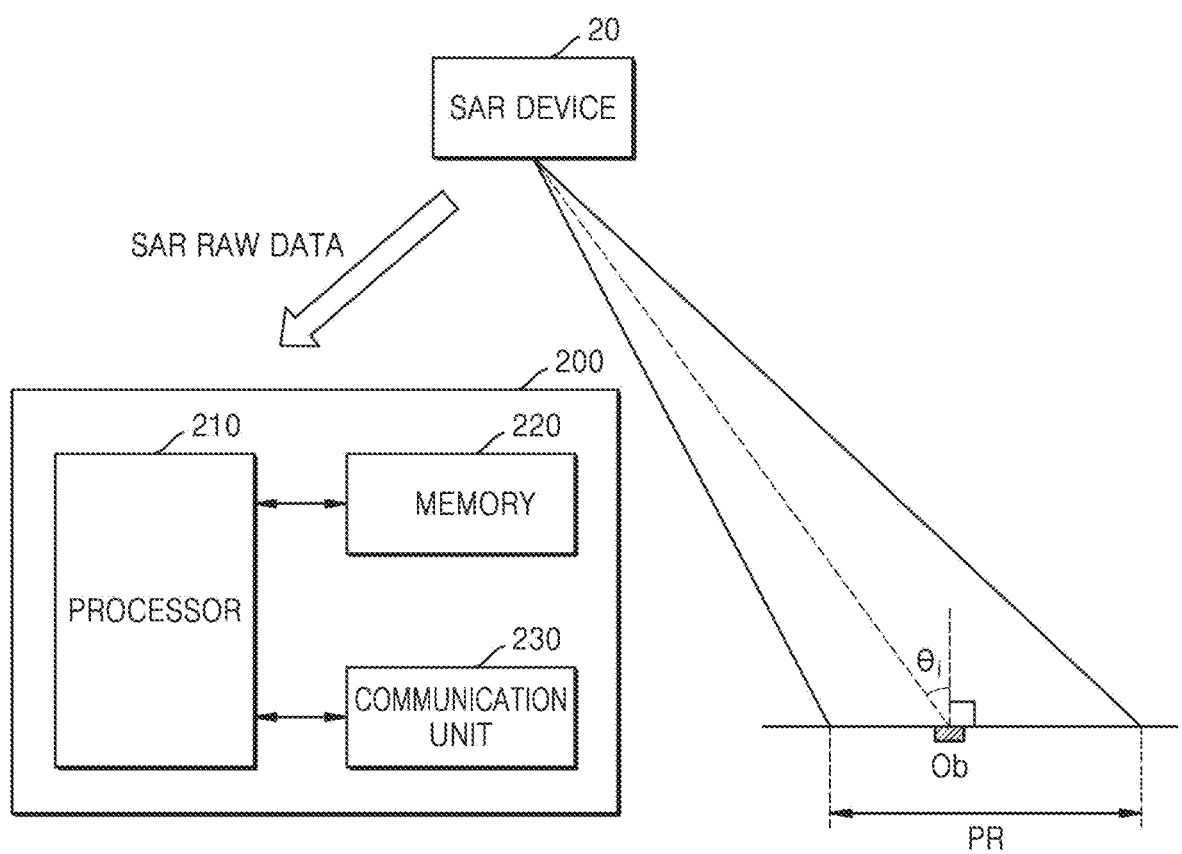
FIG. 3 shows a computing device that generates an SAR image using an SAR device and generates a reflection coefficient $K_2$ thereof, according to the disclosure.

FIG. 3 shows a computing device which generates SAR image and a reflection coefficient thereof $K_2$ using synthetic aperture radar (SAR) device.

Referring to FIG. 2, a computing device 200 according to the disclosure may include a processor 210, memory 220 and a communication unit 230. The processor 210, memory 220 and communication unit 230 may exchange data with each other via a bus. The computing device 200 may further include additional components such as input/output device and storage device, in addition to the components illustrated in FIG. 3.

The SAR device 20 may be mounted on air vehicles such as artificial satellite, aircraft, unmanned aerial vehicle or the like. SAR is a radar system that creates a ground topographic map or observes the surface by processing the minute time difference in which radar waves are reflected back to the curved surface after sequentially firing radar waves from the air to the ground or to the sea. The SAR device 20 includes a transmission/reception module for transmitting and receiving radar waves, and a control module for controlling the transmission/reception module. The SAR device 20 may observe an area to be photographed (PR) including an object (Ob) in side looking mode.

The computing device 200 may be installed, for example, in a ground station that communicates with a vehicle equipped with the SAR device 20.

The processor 210 may be configured to process commands of computer program by performing basic arithmetic, logic and input/output operations. The commands are stored in the memory 220 and the processor 210 may read the commands stored in the memory 220. For example, the processor 110 may be configured to execute received commands according to program code stored in the memory 120.

The memory 120 is a computer-readable recording medium and may include random access memory (RAM), read only memory (ROM) and a permanent mass storage device such as disk drive. In addition, program code for controlling the computing device 100 may be temporarily or permanently stored in the memory 120.

The communication unit 130 may receive SAR raw data from the SAR device 20 through wireless communication. The SAR raw data is image data generated by the SAR device and composed of pixels arranged in two dimensions.

Each of the pixels may have a complex value. The SAR raw data may be stored in the memory 120, and the processor 210 may image process the SAR raw data to generate SAR image and a reflection coefficient $K_2$ thereof. The generated SAR image and a reflection coefficient $K_2$ thereof include the SAR image 11 and reflection coefficient $K_2$ thereof in the SAR image product 10 and may be provided to the computing device 100 of FIG. 1.

Figure 4:
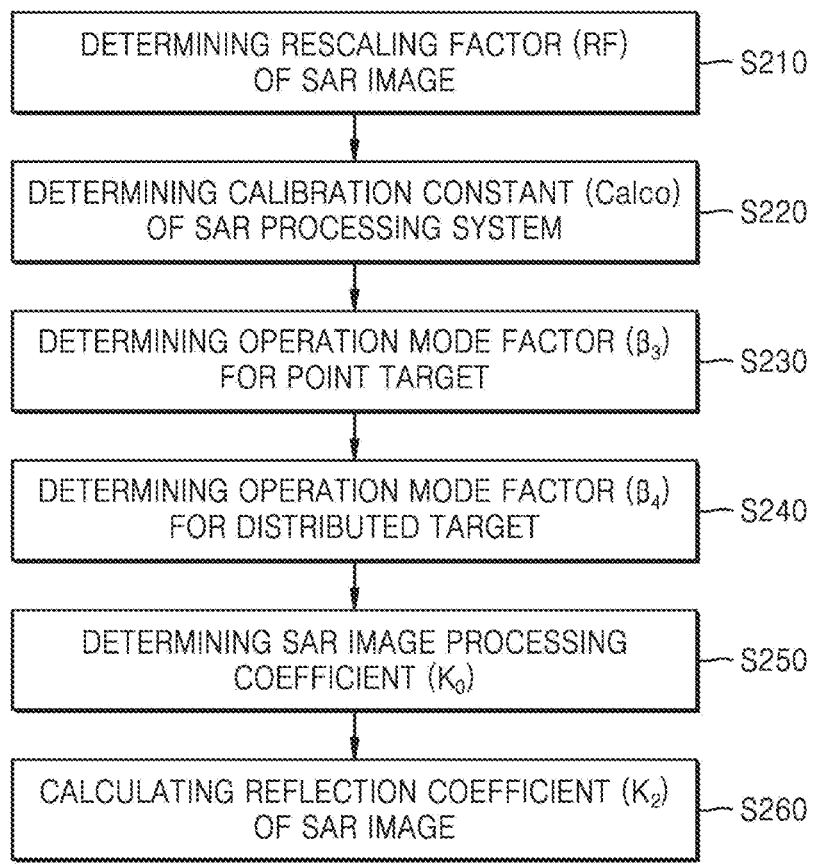
FIG. 4 is a flowchart illustrating a method of generating a reflection coefficient $K_2$ of an SAR image generated from SAR raw data, according to the disclosure.

FIG. 4 is a flowchart illustrating a method of generating a reflection coefficient $K_2$ of SAR image generated from SAR raw data according to the disclosure, wherein the SAR image represents SAR image 11 provided to the computing device 100 in FIG. 1, and the reflection coefficient $K_2$ represents a reflection coefficient $K_2$ 13 provided to the SAR image product 10 together with the SAR image 11.

Referring to FIG. 4 together with FIGS. 1 and 3, the processor 210 may determine a rescaling factor (RF) of SAR image 11 generated by capturing an area to be photographed (PR) with the SAR device 20 (S210). The processor 210 may generate SAR image 11 by receiving SAR raw data generated by the SAR device 20 capturing an area to be photographed (PR) and image processing the SAR raw data according to SAR processing. The rescaling factor (RF) is one of parameters applied when generating the SAR image 11.

The processor 210 may determine a calibration constant (Calco) of SAR processing system that has generated the SAR image 11 (S220). The SAR processing system is implemented in the processor 210 of computing device 200 generates SAR image 11 by image processing SAR raw data. The calibration constant (Calco) is one of parameters applied when generating the SAR image 11 and may be a value that varies depending on the SAR processing system.

The processor 210 may determine the operation mode factor $\beta_3$ for the point target of the SAR image 11 (S230). The operation mode in which the SAR device 20 photographs an area to be photographed (PR) to generate SAR image 11 is one of a plurality of preset operation modes. The operation mode may include, for example, strip map mode, and the operation mode factor $\beta_3$ in the strip mode is 1. When the SAR device 20 captures an area to be photographed (PR) in different operation modes, the operation mode factor $\beta_3$ for the point target is other than 1.

The processor 210 may determine the operation mode factor $\beta_4$ for the distributed target of the SAR image 11 (S240). When the SAR deice 20 captures an area to be photographed (PR) in strip map mode, the operation mode factor $\beta_4$ for the distributed target is 1. When the SAR device 20 captures an area to be photographed (PR) in different operation modes, the operation mode factor $\beta_4$ for the point target is other than 1.

The processor may determine an SAR image processing coefficient $K_0$ of SAR image 11 (S250). The SAR image processing coefficient $K_0$ of SAR image 11 is a coefficient for calculating a reflection coefficient $K_2$, which will be described in more detail below.

The processor 210 may calculate a reflection coefficient $K_2$ of SAR image 11 based on a rescaling factor (RF), the operation mode factor $\beta_3$ for the point target, the operation mode factor $\beta_4$ for a distributed target, a calibration constant (Calco) and an SAR image processing coefficient $K_0$. The processor may calculate the reflection coefficient $K_2$ of SAR image 11 using $K_2 = RF^2 \cdot \beta_3^2 \cdot Calco / (\beta_4^2 \cdot K_0^2)$.

In order to determine the rescaling factor (RF) of SAR image 11, the processor 210 may determine a reference slant range $R_{slant\_ref}$ from the SAR device 20 to an area to be photographed (PR). Since the area to be photographed (PR) is observed in side looking mode, its slant range, i.e., a distance, from the SAR device 20 varies according to its location. The reference slant range $R_{slant\_ref}$ is used to correct the distance difference within the area to be photographed (PR) since even with respect to the same object, the object is displayed brighter as the object gets closer to the SAR device 20 and the object is displayed darker as the object gets farther therefrom. That is, the signal may be corrected to indicate that an arbitrary position within an area to be photographed (PR) is spaced apart from the SAR device 20 by the reference slant range $R_{slant\_ref}$.

Figure 5:
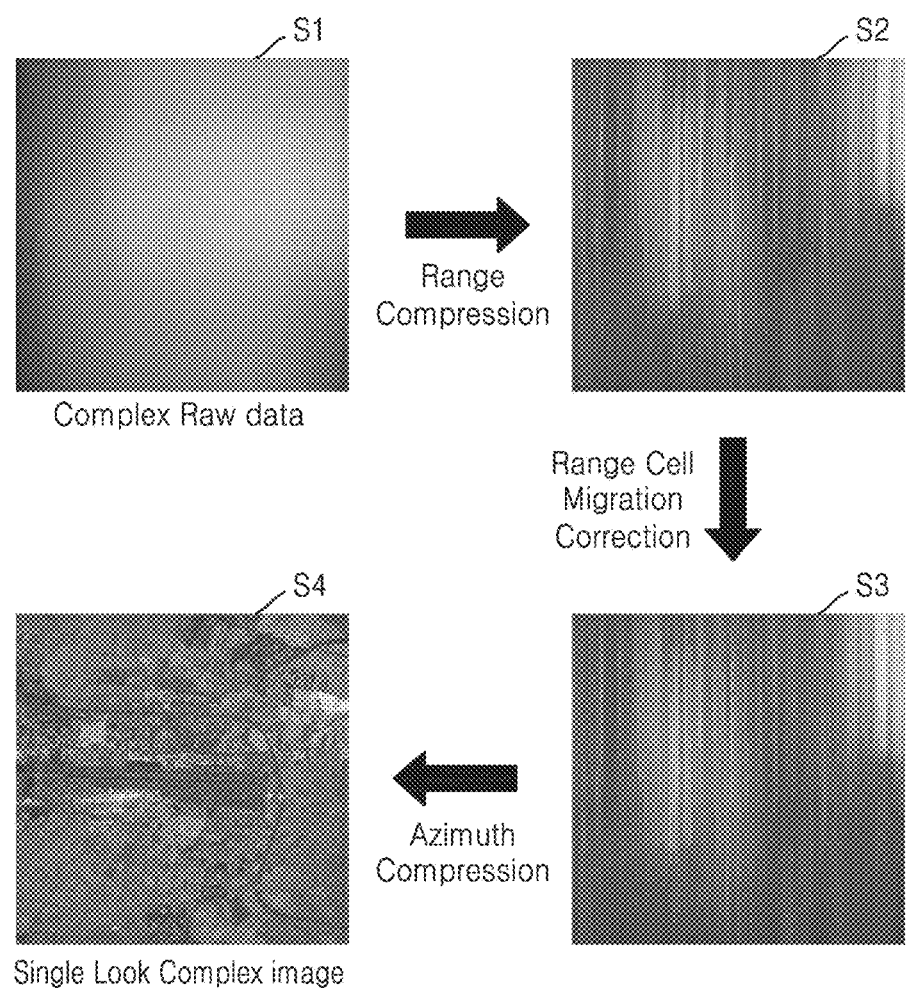
FIG. 5 is a diagram for explaining a process of SAR signal processing and image forming.

FIG. 5 is an exemplary diagram for explaining a process of processing SAR signals and forming image.

Referring to FIG. 5, S1 represents exemplary SAR raw data. S1 indicates that SAR raw data is composed of complex values and signals are overlapped in the slant range direction and azimuth direction. S2 represents data after compressing SAR raw data in the slant range direction. As described above, since the area to be photographed (PR) is observed in side looking mode, its slant range, i.e., a distance, from the SAR device 20 varies according to its location. Thus, S3 represents data obtained by determining the reference slant range $R_{slant\_ref}$ from the SAR device 20 to the area to be photographed (PR) and correcting S2 in the slant range direction based on the reference slant range $R_{slant\_ref}$. When S3 is compressed in the azimuth direction, SAR complex image is generated and image like S4 are generated based on the SAR complex image.

Referring back to FIG. 4, the processor 210 may determine a quantization coefficient (Qs) used to determine digital number (DN) of each pixel of the SAR image 11. The quantization coefficient (Qs) is a coefficient for converting the level of reception signals into digital number (DN), and for matching digital number (DN) with the level of reception signals. The minimum value of digital number (DN) and the maximum value of digital number (DN) may correspond to the minimum value of the level of reception signal and the maximum value of the level of reception signal, respectively. The quantization coefficient (Qs) may be calculated using Quantization$_{step}$/(RaProcScale·AzProcScale), where uantization$_{step}$ is a quantization step value, and RaProcScale and AzProcScale are scaling factors applied to image processing in the slant range direction and applied to image processing in the azimuth direction, respectively.

The processor 210 may calculate the rescaling factor (RF) using $4\pi R_{slant\_ref}^2 \cdot Qs$. The calculated rescaling factor (RF) may be stored in the memory 220.

In order to determine the calibration constant (Calco) of SAR processing system, the SAR device 20 operating in strip map mode may generate first SAR raw data by observing a point target. The point target is a target of which radar cross section $RCS_{point\_target}$, location and position are known, and may be installed in a preset position at a preset location. The point target has a preset radar cross section $RCS_{point\_target}$ according to its size or performance. The point target may be a corner reflector or an active transponder. The point target is a device that reflects laser waves transmitted from the SAR device 20 entirely to the SAR device 20. The computing device 200 may acquire first SAR raw data.

The processor 210 may generate a first raw SAR image based on the first SAR raw data. The first raw SAR image is generated by compensating for the antenna pattern according to positional relation between the point target and the SAR device 20 using RCS profile data according to the antenna pattern for the point target without applying windowing to the first SAR raw data. The RCS profile data according to the antenna pattern for the point target may be previously stored in the processor 210. The gain of antenna pattern may vary according to positional relation between the point target and the SAR device 20. The first raw SAR image may be an image processed to compensate for the antenna pattern according to positional relation between the point target and the SAR device 20 using RCS profile data of the point target stored in advance with respect to the first SAR raw data.

The processor 210 may generate the first SAR image by removing a clutter level from the first raw SAR image. According to an embodiment, the processor 210 may calculate a first complex clutter value corresponding to the clutter level based on complex values of an area independent of a point target in the first raw SAR image. The clutter level means a complex value corresponding to an area without a point target, that is a background, and may be calculated as a first clutter complex value by averaging complex values of all pixels in four areas in a diagonal direction of the point target. The processor 210 may generate the first SAR complex image by subtracting the first clutter complex value from the complex values of all pixels of the first raw SAR image. The processor 210 may generate the first SAR image by calculating the size of each complex value of all pixels of the first SAR complex image. The processor 210 may determine the size of the complex value by calculating the absolute value of each complex value of all pixels of the first SAR complex image.

Figure 6A:
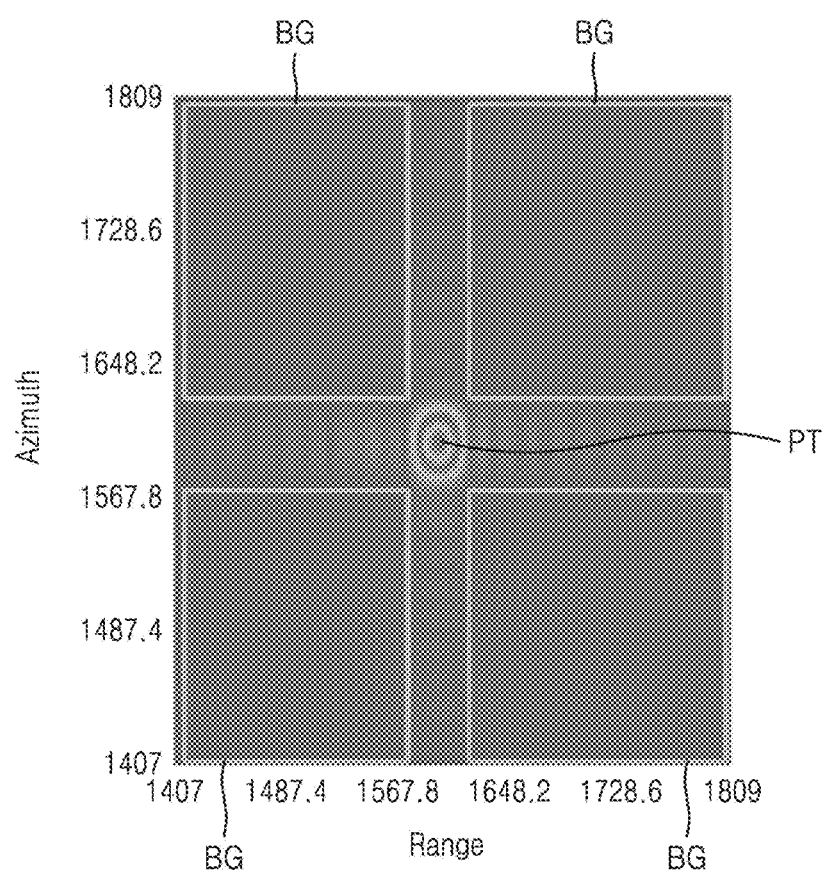
FIGS. 6A and 6B illustrate a first SAR image obtained by capturing a point target (PT).

FIG. 6A illustrates an exemplary first SAR image obtained by capturing a point target (PT).

Referring to FIG. 6A, a point target (PT) is displayed at the center of the first SAR image. The central portion of the point target (PT) is the largest in size and the periphery thereof gets smaller in size as getting farther from the center. The point target (PT) is expressed as a sinc function. As compression in the slant range direction and compression in the azimuth direction are performed during SAR image processing, an afterimage may be displayed in the horizontal direction (the slant range direction) and the vertical direction (the azimuth direction) of the point target (PT). In FIG. 6A, four areas (BG) in the diagonal direction of the point target (PT) are not affected by the PT. The first clutter complex value corresponding to the clutter level may be calculated by averaging the complex values of all pixels in the diagonal regions (BG).

Referring back to FIG. 4, the processor 210 may calculate the calibration constant (Calco) based on the radar cross section $RCS_{point\_target}$ of the point target, digital number of pixels corresponding to the position of the point target in the first SAR image DN$_1$, and the rescaling factor (RF). The calibration constant (Calco) may be calculated using $DN_1 \cdot RF \cdot (Calco)^{1/2} = (RCS_{point\_target})^{1/2}$.

According to an embodiment, in order to determine an operation mode factor $\beta_3$ for the point target of the SAR image 11, the SAR device 20 operating in the same operation mode at the same observation location as when generating the SAR image 11 may generate second SAR raw data by observing the same point target as when generating the first SAR raw data. The computing device 200 may acquire second SAR raw data. The processor 210 may generate a second SAR image by performing SAR image processing on the second SAR raw data.

The processor 210 may generate a second raw SAR image by compensating for the antenna pattern according to the positional relation between the point target and the SAR device 20 using RCS profile data according to the antenna pattern for the point target without applying windowing to the second SAR raw data. The processor 210 may generate the second SAR image by removing the clutter level from the second raw SAR image. The processor 210 may calculate a second clutter complex value corresponding to the clutter level based on complex values of an area independent of the point target in the second raw SAR image, and generate the second SAR complex image by subtracting the second clutter complex value from complex values of all pixels of the second raw SAR image. The processor 210 may generate the second SAR image by calculating the size of each complex value of all pixels of the second SAR complex image.

The processor 210 may calculate the operation mode factor $\beta_3$ for the point target of SAR image 11 based on digital number DN$_1$ of pixels corresponding to the location of the point target in the first SAR image and digital number DN$_2$ of pixels corresponding to the location of point target in the second SAR image. The operation mode factor $\beta_3$ for the point target of SAR image 11 may be calculated using $DN_1 = DN_2 \cdot \beta_3$.

According to another embodiment, in order to determine the operation mode factor $\beta_3$ for the point target of SAR image 11, the processor 210 may determine the first rescaling factor RF$_1$ of the first SAR image. The processor 210 operating in the same operation mode as when generating the SAR image 11 may generate second SAR raw data by observing the same point target as when generating the first SAR raw data. The computing device 200 may acquire the second SAR raw data. The processor 210 may generate a second SAR image by performing SAR image processing on the second SAR raw data.

The processor 210 may generate a second raw SAR image by compensating for the antenna pattern according to the positional relation between the point target and the SAR device 20 using RCS profile data according to the antenna pattern for the point target without applying windowing to the second SAR raw data. The processor 210 may generate the second SAR image by removing the clutter level from the second raw SAR image. The processor 210 may calculate a second clutter complex value corresponding to the clutter level based on complex values of an area independent of the point target in the second raw SAR image, and generate the second SAR image by subtracting the second clutter complex value from complex values of all pixels of the second raw SAR image to generate the second SAR complex image and calculating the size of each complex value of all pixels of the second SAR complex image. The processor 210 may determine a second rescaling factor $RF_2$ of the second SAR image.

The processor 210 may calculate an operation mode factor $\beta_3$ for the point target of SAR image 11 based on digital number $DN_1$ of pixels corresponding to the location of the point target in the first SAR image, the first rescaling factor $RF_1$, digital number $DN_2$ of pixels corresponding to the location of point target in the second SAR image and the second rescaling factor $RF_2$. The operation mode factor $\beta_3$ may be calculated using $DN_1 \cdot RF_1 = DN_2 \cdot RF_2 \cdot \beta_3$.

According to an embodiment, in order to determine an operation mode factor $\beta_4$ for the dispersion target of the SAR image 11, the SAR device 20 operating in strip map mode may generate a third SAR image by observing a homogeneous area of which location is known and performing SAR image processing. For example, the SAR device 20 operating in strip map mode may generate third SAR raw data by observing a homogeneous area of which location is known. The computing device 200 may acquire the third SAR raw data. The processor 210 may generate a third SAR image by performing SAR image processing on the third SAR raw data. The processor 210 may generate the third raw SAR image without applying windowing to the third SAR raw data. The processor 210 may generate a third SAR complex image by removing the clutter level from the third raw SAR image, and generate a third SAR image by calculating the size of each complex value of all pixels of the third SAR complex image.

The SAR device 20 operating in the same operation mode at the same observation location as when generating the SAR image 11 may generate the fourth SAR raw data by observing the same homogeneous area as when generating the third SAR raw data. The computing device 200 may acquire the fourth SAR raw data. The processor 210 may generate a fourth SAR image by performing SAR image processing on the fourth SAR raw data. The processor 210 may generate the fourth raw SAR image without applying windowing to the fourth SAR raw data. The processor 210 may generate a fourth SAR complex image by removing the clutter level from the fourth raw SAR image, and generate a fourth SAR image by calculating the size of each complex value of all pixels of the fourth SAR complex image.

The processor 210 may determine the resolution ratio $\rho_{slrrfocd4}$ in the slant range direction of the fourth SAR image to the third SAR image, and determine the resolution ratio $\rho_{slrafocd4}$ in the azimuth direction of the fourth SAR image to the third SAR image.

The processor 210 may calculate an operation mode factor $\beta_4$ for the distributed target of SAR image 11 based on digital number $DN_3$ of pixels corresponding to the location of homogeneous area in the third SAR image, digital number $DN_4$ of pixels corresponding to the location of homogeneous area in the fourth SAR image and the operational mode factor $\beta_3$ for the distributed target of the SAR image. The operation mode factor $\beta_4$ for the distributed target of SAR image 11 may be calculated using $DN_3 = DN_4 \cdot \beta_3 / (\rho_{slrrfocd4} \cdot \rho_{slrafocd4} \cdot 4)$.

In order to determine the SAR image processing coefficient $K_0$ of the SAR image 11, the processor 210 may determine a resolution ratio $\rho_{slrrfocd}$ in the slant range direction of the SAR image 11 to the first SAR image and a resolution ratio $\rho_{slrafocd}$ in the azimuth direction of the SAR image 11 to the first SAR image. The resolution ratio in the slant range direction $\rho_{slrrfocd}$ is calculated by the ratio of the resolution in the slant range direction of the SAR image 11 to the resolution in the slant range direction of the first SAR image, and the resolution ratio in the azimuth direction $\rho_{slrafocd}$ may be calculated by the ratio of the resolution in the azimuth direction of the SAR image 11 to the resolution in the azimuth direction of the first SAR image.

The processor 210 may determine a peak reduction rate $\alpha\beta_1$ depending on whether windowing is applied during SAR image processing and may determine an amplification factor $f_{broadf\_ra\_az}$ according to windowing application during SAR image processing. The processor 210 may calculate the SAR image processing coefficient $K_0$ based on the peak reduction rate $\alpha\beta_1$, the resolution ratio in the slant range direction $\rho_{slrrfocd}$, the resolution ratio in the azimuth direction $\rho_{slrafocd}$, and the amplification factor $f_{broadf\_ra\_az}$. The SAR image processing coefficient $K_0$ may be calculated using $K_0 = \alpha\beta_1 \cdot \rho_{slrrfocd} \cdot \rho_{slrafocd} \cdot f_{broadf\_ra\_az}$.

In order to determine the peak reduction rate $\alpha\beta_1$ according to whether or not windowing is applied during SAR image processing, the processor 210 may apply windowing to the first SAR raw data, generate fifth raw SAR data by compensating for the positional relation between the point target and the SAR device 20 using RCS profile data according to the antenna pattern for the point target, and generate a fifth SAR image by removing the clutter level from the fifth raw SAR image. The processor 210 may calculate a fifth clutter complex value corresponding to the clutter level based on complex values of an area independent of the point target in the fifth raw SAR image, generate a fifth SAR complex image by subtracting a fifth clutter complex value from the complex values of all pixels of the fifth raw SAR image, and generate the fifth SAR image by calculating the size of each complex value of all pixels of the fifth SAR complex image.

The processor 210 may calculate a peak reduction rate $\alpha\beta_1$ based on peak digital number $DN_{f1}$ of pixels corresponding to the position of the point target in the first SAR image and peak digital number $DN_{f5}$ of pixels corresponding to the location of the point target in the fifth SAR image The peak reduction rate $\alpha\beta_1$ may be calculated using $DN_{f5} = DN_{f1} \cdot \alpha\beta_1$. The peak reduction rate $\alpha\beta_1$ may be understood as $\alpha_1 \cdot \beta_1$, where $\alpha_1$ is a sinc peak reduction rate in the slant range direction due to windowing in slant range direction and $\beta_1$ is a sinc peak reduction rate in the azimuth direction due to windowing in azimuth direction.

The amplification factor $f_{broadf\_ra\_az}$ according to windowing application during SAR image processing may vary depending on whether windowing is applied during SAR image processing to generate SAR image 11. According to an embodiment, when windowing is not applied during SAR image processing for generating the SAR image, the amplification factor $f_{broadf\_ra\_az}$ according to windowing application during the SAR image processing may be determined by the magnitude value of complex values which is the sum of complex values of all pixels of the first SAR complex image divided by peak digital number $DN_{f1}$ of pixels corresponding to the location of the point target of the first SAR image. According to another embodiment, when windowing is applied during SAR image processing for generating the SAR image 11, the amplification factor $f_{broadf\_ra\_az}$ according to windowing application during the SAR image processing may be determined by the magnitude value of complex values which is the sum of complex values of all pixels of the fifth SAR complex image divided by peak digital number $DN_{f5}$ of pixels corresponding to the location of the point target of the fifth SAR image.

The first and fifth SAR images are generated based on the first SAR raw data, where the first SAR image is generated through SAR image processing that does not apply windowing to the first SAR raw data and where the fifth SAR image is generated through SAR image processing that applies winnowing to the first SAR raw data.

Figure 6B:
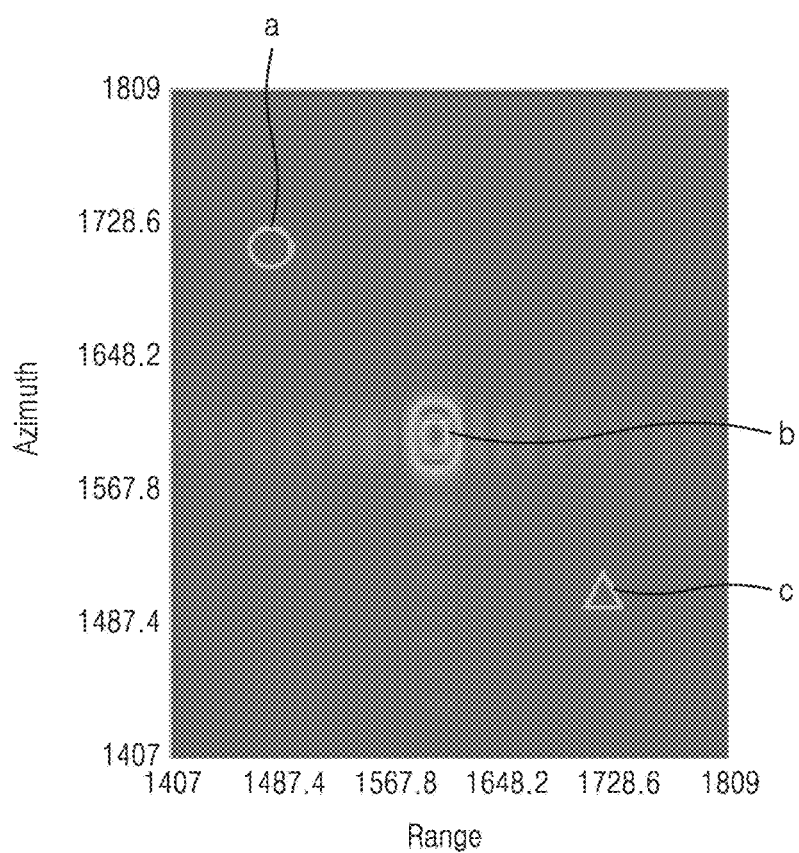

FIG. 6B shows an exemplary first SAR image obtained by capturing the point target (PT).

Referring to FIG. 6B, a 2D impulse response function area for one point target (PT) is shown. If this is for a distributed target, the signal of point source constituting an object at position (a) will interfere with position (b) and affect the brightness value of point source constituting an object at position (b). The signal of point target at position (b) will affect the brightness value at position (c). Thus, the magnitude by which point sources of objects at all other nearby locations affect the brightness value of position (b) may be calculated by calculating the magnitude by which the point target at position (b) affects the bright values of the locations. Since the interfering signals from the point target at position (b) have different magnitude and phase information according to the position of the point source, the sum of 2D complex values is calculated by reflecting them. That is, it is used that the signals affecting position (b) as a response of the point source at position (a) correspond to the signals at position (c) in the response of the point source at position (b) and the response of the 2D impulse response function.

Referring back to FIG. 4, according to another embodiment, in order to determine the operation mode factor $\beta_4$ for the dispersion target of SAR image 11, the SAR device 20 operating in strip map mode may generate a third SAR image by observing the homogeneous area of which location is known and performing SAR image processing. For example, the SAR device 20 operating in strip map mode may generate third SAR raw data by observing a homogeneous area of which location is known. The computing device 200 may acquire the third SAR raw data. The processor 210 may generate a third SAR image by performing SAR image processing on the third SAR raw data. The processor 210 may generate the third raw SAR image without applying windowing to the third SAR raw data. The processor 210 may generate a third SAR complex image by removing the clutter level from the third raw SAR image, and generate a third SAR image by calculating the size of each complex value of all pixels of the third SAR complex image. The processor 210 may determine a third rescaling factor $RF_3$ of the third SAR image.

The processor 210 may determine a local incidence angle $\theta_3$ corresponding to the homogeneous area in the third SAR image based on the location of the homogeneous area and the observation location of the SAR device when generating the third SAR raw data.

The SAR device 20 operating in the same operation mode as when generating the SAR image 11 may generate fourth SAR raw data by observing same the homogeneous area as when generating the third SAR raw data. The computing device 200 may acquire the fourth SAR raw data. The processor 210 may generate a fourth SAR image by performing SAR image processing on the fourth SAR raw data. The processor 210 may generate the fourth raw SAR image without applying windowing to the fourth SAR raw data.

The processor 210 may generate a fourth SAR complex image by removing the clutter level from the fourth raw SAR image, and generate a fourth SAR image by calculating the size of each complex value of all pixels of the fourth SAR complex image. The processor 210 may determine a fourth rescaling factor $RF_4$ of the fourth SAR image.

The processor 210 may determine a local incidence angle ($\theta_5$) corresponding to the homogeneous area in the fifth SAR image based on the location of the homogeneous area and the observation location of the SAR device when generating the fourth SAR raw data.

The processor 210 may determine the resolution ratio $\rho_{slrrfocd4}$ in the slant range direction of the fourth SAR image to the third SAR image, and determine the resolution ratio $\rho_{slrafocd4}$ in the azimuth direction of the fourth SAR image to the third SAR image.

The processor 210 may calculate an operation mode factor $\beta_4$ for the distributed target of SAR image 11 based on digital number $DN_3$ of pixels corresponding to the location of homogeneous area in the third SAR image, digital number $DN_4$ of pixels corresponding to the location of homogeneous area in the fourth SAR image and the operational mode factor $\beta_3$ for the distributed target of the SAR image. The operation mode factor $\beta_4$ may be calculated using $DN_3 \cdot RF_3 \cdot \sin\theta_3 = DN_4 \cdot RF_4 \cdot \sin\theta_4 \cdot \beta_3/(\rho_{slrrfocd4} \cdot \rho_{slrafocd4} \cdot \beta_4)$.

According to the disclosure, the power level reflectance $\sigma_{0\_3}$ of the homogeneous area on the ground calculated based on the third SAR image is identical to the power level reflectance $\sigma_{0\_4}$ of the homogeneous area on the ground calculated based on the fourth SAR image.

The various embodiments described above are exemplary and do not need to be performed independently of each other. The embodiments described in this description may be implemented in combination.

The various embodiments described above may be implemented in the form of a computer program that is executable through various components on a computer, and such a computer program may be recorded in a computer-readable medium. The medium may be to continuously store the program executable by the computer, or to temporarily store the program for execution or download. The medium may also be various recording means or storage means of a form in which one or a plurality of pieces of hardware has been combined, and may be distributed over a network, not limited to a medium directly connected to a computer system. Examples of the medium may include magnetic media such as hard disks, floppy disks, and magnetic tape; optical media such as CD-ROM and DVD; magneto-optical media such as floptical disks; and media configured to store program instructions, such as ROM, RAM, flash memory, and the like. Furthermore, other examples of the medium may include an app store in which apps are distributed, a site in which other various pieces of software are supplied or distributed, and recording media and/or store media managed in a server.

In this description, "unit", "module", etc. may be a hardware component such as a processor or circuit, and/or a software component executed by a hardware component such as a processor. For example, "unit", "module", etc. may be implemented by components such as software components, object-oriented software components, class components and task components, and processes, functions, properties, procedures, subroutines, segments of program code, drivers, firmware, microcode, circuitry, data, database, data structures, tables, arrays and variables.

The foregoing description of the disclosure is for purposes of illustration, and a person skilled in the art may easily modify and change the embodiments in various ways from the description without changing technical ideas or essential features of the disclosure. Therefore, the embodiments described above are to be considered illustrative in all respects and are not intended to limit the disclosure, For example, each component described as singular may be distributed, and similarly components described as distributed may also be combined.

According to the disclosure, it is possible to provide a new analysis method in consideration of the SAR image processing process with respect to the relation between the brightness value of the SAR image data and the reflectance of object. Also, it is possible to provide a method of calculating the power level reflectance ($\sigma_0$, sigma naught) of an object on the ground from the SAR image data. According to the disclosure, it is possible to provide a method of generating the reflection coefficient $K_2$ of the SAR image in consideration of the SAR image processing process for generating the SAR image.

It should be understood that embodiments described herein should be considered in a descriptive sense only and not for aims of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of generating, by a computing device, a synthetic aperture radar (SAR) image and a reflection coefficient K2 thereof, the method comprising:
   determining a rescaling factor (RF) of the SAR image generated by capturing an area to be photographed with an SAR device;
   determining a calibration constant (Calco) of an SAR processing system which generates the SAR image;
   determining an operation mode factor β3 for a point target of the SAR image;
   determining an operation mode factor β4 for a distributed target of the SAR image;
   determining an SAR image processing coefficient K0 of the SAR image; and
   based on the rescaling factor (RF), the operation mode factor β3 for the point target, the operation mode factor β4 for the distributed target, the calibration constant (Calco), and the SAR image processing coefficient K0, calculating a reflection coefficient K2 using an equation that K2=RF2·β32·Calco/(β42·K02).

2. The method of claim 1, wherein the determining of the rescaling factor (RF) of the SAR image comprises:
   determining a reference slant range Rslant_ref from the SAR device to the area to be photographed;
   determining a quantization coefficient (Qs) used to determine a digital number DN of each pixel of the SAR image; and
   calculating the rescaling factor (RF) using an equation that RF=4πRslant_ref2·Qs.

3. The method of claim 1, wherein the determining of the calibration constant (Calco) of the SAR processing system comprises:
   generating SAR raw data by observing a point target of which a radar cross section RCSpoint_target, a location, and a position are known, by using the SAR device operating in a strip map mode;
   generating a first raw SAR image by compensating for an antenna pattern according to a positional relationship between the position of the point target and the SAR device using RCS profile data according to the antenna pattern for the point target, without applying windowing to the SAR raw data;
   generating a first SAR image by removing a clutter level from the first raw SAR image; and
   calculating the calibration constant (Calco) using an equation that DN1·RF·(Calco) ½=(RCSpoint_target)½, based on the radar cross section of the point target RCSpoint_target, a digital number DN1 of pixels corresponding to the location of the point target of the first SAR image and the rescaling factor (RF).

4. The method of claim 3, wherein the generating of the first SAR image by removing a clutter level from the first raw SAR image comprises:
   calculating clutter complex values corresponding to the clutter level based on complex values of an area independent of the point target in the first raw SAR image;
   generating a first SAR complex image by subtracting the clutter complex values from complex values of all pixels of the first raw SAR image; and
   generating the first SAR image by calculating the magnitude of each complex value of all pixels of the first SAR complex image.

5. The method of claim 3, wherein the determining of the operation mode factor β3 for a point target of the SAR image comprises:
   generating a second SAR image by observing the point target using the SAR device operating in a same operation mode as the SAR image, and performing SAR image processing; and
   calculating, using DN1=DN2·β3, the operation mode factor β3 for the point target based on digital number DN1 of pixels corresponding to the location of the point target of the first SAR image and the digital number DN2 of pixels corresponding to the location of the point target of the second SAR image.

6. The method of claim 3, wherein the determining of the operation mode factor β3 for a point target of the SAR image comprises
   determining a first rescaling factor RF1 of the first SAR image;
   generating a second SAR image by observing the point target using the SAR device operating in a same operation mode as the SAR image, and performing SAR image processing;
   determining a second rescaling factor RF2 of the second SAR image; and
   calculating, using an equation that DN1·RF1=DN2·RF2·β3, the operation mode factor β3 for the point target based on the digital number DN1 of pixels corresponding to the location of the point target of the first SAR image, the first rescaling factor RF1, a digital number DN2 of pixels corresponding to the location of the point target of the second SAR image, and the second rescaling factor RF2.

7. The method of claim 3, wherein the determining of an operation mode factor β4 for a distributed target of the SAR image comprises:
   generating a third SAR image by observing a homogeneous area of which location is known using the SAR device operating in the strip map mode, and performing image processing;

generating a fourth SAR image by observing the homogeneous area at a same observation location using the SAR device operating in a same operation mode as the SAR image, and performing SAR image processing;
determining a resolution ratio pslrrfocd4 in the slant range direction of the fourth SAR image to the third SAR image;
determining a resolution ratio pslrafocd4 in the azimuth direction of the fourth SAR image to the third SAR image; and
calculating, using an equation that DN3=DN4·β3/(pslrrfocd4·pslrafocd4·β4), the operation mode factor β4 for the distributed target of the SAR image based on a digital number DN3 of pixels corresponding to the location of the homogeneous area of the third SAR image, a digital number DN4 of pixels corresponding to the location of the homogeneous area of the fourth SAR image, and the operation mode factor β3 for the point target.

8. The method of claim 3, wherein the determining of the SAR image processing coefficient K0 of the SAR image comprises:
determining a resolution ratio pslrrfocd in a slant range direction of the SAR image to the first SAR image;
determining a resolution ratio pslrafocd in an azimuth direction of the SAR image to the first SAR image;
determining a peak reduction rate αβ1 depending on whether windowing is applied during the SAR image processing;
determining an amplification factor fbroadf_ra_az according to windowing application during SAR image processing; and
calculating, using an equation that K0=αβ1·pslrrfocd·pslrafocd·fbroadf_ra_az, the SAR image processing coefficient K0 based on the peak reduction rate αβ1, the resolution ratio pslrrfocd in the slant range direction, the resolution ratio pslrafocd in the azimuth direction, and the amplification factor fbroadf_ra_az.

9. The method of claim 8, wherein the resolution ratio pslrrfocd in the slant range direction is calculated by a ratio of the resolution in the slant range direction of the SAR image to the resolution in the slant range direction of the first SAR image.

10. The method of claim 8, wherein the resolution ratio pslrafocd in the azimuth direction is calculated by a ratio of the resolution in the azimuth direction of the SAR image to the resolution in the azimuth direction of the first SAR image.

11. The method of claim 8, wherein the determining of a peak reduction rate αβ1 depending on whether windowing is applied during the SAR image processing comprises:
generating a second raw SAR image by applying windowing to the SAR raw data and compensating for an antenna pattern in accordance with positional relation between the point target and the SAR device using RCS profile data according to the antenna pattern for the point target;
generating a fifth SAR image by removing a clutter level from the second raw SAR image; and
calculating, using an equation that DNf5=DNf·αβ1, the peak reduction rate αβ1 based on a peak digital number DNf1 of pixels corresponding to the location of the point target of the first SAR image and a peak digital number DNf5 of pixels corresponding to the location of the point target of the fifth SAR image.

12. The method of claim 11, wherein the generating of the first SAR image by removing a clutter level from the first raw SAR image comprises:
calculating a first clutter complex value corresponding to the clutter level based on complex values of an area independent of the point target in the first raw SAR image; and
generating a first SAR complex image by subtracting the first clutter complex value from complex values of all pixels of the first raw SAR image;
and wherein when windowing is not applied during SAR image processing for generating the SAR image, the amplification factor fbroadf_ra_az according to windowing application during the SAR image processing may be determined by the magnitude value of complex values which is the sum of complex values of all pixels of the first SAR complex image divided by peak digital number DNf1 of pixels corresponding to the location of the point target of the first SAR image.

13. The method of claim 11, wherein the generating of a fifth SAR image by removing a clutter level from the second raw SAR image comprises:
calculating a second clutter complex value corresponding to the clutter level based on complex values of an area independent of the point target in the second raw SAR image; and
generating a second SAR complex image by subtracting the second clutter complex value from complex values of all pixels of the second raw SAR image,
and wherein when windowing is applied during SAR image processing for generating the SAR image, the amplification factor fbroadf_ra_az according to windowing application during the SAR image processing is determined by the magnitude value of complex values which is the sum of complex values of all pixels of the second SAR complex image divided by a peak digital number DNf5 of pixels corresponding to the location of the point target of the fifth SAR image.

14. The method of claim 13, wherein the determining of the operation mode factor β4 for a distributed target of the SAR image comprises:
generating a third SAR image by observing a homogeneous area of which location is known using the SAR device operating in the strip map mode and performing image processing;
determining a third rescaling factor RF3 of the third SAR image;
determining a local incidence angle θ3 corresponding to the homogeneous area in the third SAR image based on the location of the homogeneous area and the observation location of the SAR device;
generating a fourth SAR image by observing the homogeneous area using the SAR device operating in the same operation mode as the SAR image and performing SAR image processing;
determining a fourth rescaling factor RF4 of the fourth SAR image;
determining a resolution ratio pslrrfocd4 in the slant range direction of the fourth SAR image to the third SAR image;
determining a resolution ratio pslrafocd4 in the azimuth direction of the fourth SAR image to the third SAR image;
determining a local incidence angle θ4 corresponding to the homogeneous area in the fourth SAR image based on location of the homogeneous area and observation location of the SAR device; and calculating, using an equation that $DN3 \cdot RF3 \cdot \sin\theta3 = DN4 \cdot RF4 \cdot \sin\theta4 \cdot \beta3/(\rho slrrfocd4 \cdot \rho slrafocd4 \cdot \beta4)$, the operation mode factor $\beta4$ for the distributed target of the SAR image based on a digital number DN3 of pixels corresponding to the location of the homogeneous area of the third SAR image, a digital number DN4 of the pixels corresponding to the location of the homogeneous area of the fourth SAR image, and the operation mode factor $\beta3$ for the point target.

15. The method of claim 14, wherein the power level reflectance $\sigma0\_3$ of the homogeneous area on the ground calculated based on the third SAR image is identical to the power level reflectance $\sigma0\_4$ of the homogeneous area on the ground calculated based on the fourth SAR image.

\* \* \* \* \*